US012005983B2

(12) United States Patent
Rasche et al.

(10) Patent No.: US 12,005,983 B2
(45) Date of Patent: Jun. 11, 2024

(54) CARGO BIKE TRANSPORT CARRIER (71) Applicant: RTI Sports GmbH, Koblenz (DE)

(72) Inventors: Johannes Rasche, Darmstadt (DE); Arndt Graeve, Koblenz (DE)

(73) Assignee: RTI Sports GmbH, Koblenz (DE)

( * ) Notice: Subject to any disclaimer, the term of this patent is extended or adjusted under 35 U.S.C. 154(b) by 201 days.

(21) Appl. No.: 17/008,796

(22) Filed: Sep. 1, 2020

(65) Prior Publication Data
US 2021/0061387 A1    Mar. 4, 2021

(30) Foreign Application Priority Data

Sep. 2, 2019   (DE) .................... 20 2019 104 808.5
Feb. 28, 2020  (DE) .................... 20 2020 101 110.3

(51) Int. Cl.
*B62J 1/16*      (2006.01)
*B62J 1/28*      (2006.01)
*B62K 7/00*      (2006.01)

(52) U.S. Cl.
CPC .................. *B62J 1/167* (2013.01); *B62J 1/28* (2013.01); *B62K 7/00* (2013.01)

(58) Field of Classification Search
CPC ........ B62K 27/003; B62K 7/00; B62K 27/00; B62J 1/16; B62J 1/167; B62J 1/28
See application file for complete search history.

(56) References Cited

U.S. PATENT DOCUMENTS

| 2,436,991 | A | * | 3/1948 | Dirksen | B62J 1/165 280/47.35 |
| 4,282,993 | A | * | 8/1981 | Humlong | B62J 9/21 224/450 |
| 4,367,829 | A | * | 1/1983 | Kusz | B62J 7/04 297/215.11 |
| 4,830,134 | A | * | 5/1989 | Hashimoto | B62J 35/00 180/219 |
| 5,423,462 | A |   | 6/1995 | Dickhaus | |
| 7,152,554 | B2 | * | 12/2006 | Crawford | B60P 3/04 119/453 |
| 9,840,301 | B2 | * | 12/2017 | Barak | B62K 7/00 |
| 2004/0130118 | A1 | * | 7/2004 | Britton | B62K 27/04 280/204 |
| 2005/0057081 | A1 | * | 3/2005 | Kahn | B60N 2/305 297/331 |
| 2005/0098972 | A1 | * | 5/2005 | Lee | B62J 1/16 280/87.021 |
| 2017/0021890 | A1 |   | 1/2017 | Barak et al. | |

FOREIGN PATENT DOCUMENTS

WO   2016060604 A1   4/2016

* cited by examiner

*Primary Examiner* — Sarah B McPartlin
(74) *Attorney, Agent, or Firm* — The Webb Law Firm (57) ABSTRACT

A cargo bike transport carrier for transporting persons includes at least one seat element arranged inside the cargo bike transport carrier. The seat element is fastened via a holding means. According to a preferred embodiment, for ensuring good load transmission, the holding means are configured as a circumferential bracket and connecting bars.

21 Claims, 8 Drawing Sheets

CARGO BIKE TRANSPORT CARRIER

CROSS-REFERENCE TO RELATED APPLICATIONS

This application claims priority to German Patent Utility Model Application Nos. 20 2019 104 808.5 filed Sep. 2, 2019 and 20 2020 101 110.3 filed Feb. 28, 2020, the disclosures of which are hereby incorporated by reference in their entirety.

BACKGROUND OF THE INVENTION

Field of the Invention

The disclosure relates to a cargo bike transport carrier, in particular for transporting persons.

Description of Related Art

Cargo bikes suitable for transporting persons, in particular children, comprise a corresponding cargo bike transport carrier. Said carrier is frequently made from plastic material, wood or the like. In particular for transporting children it is common practice to arrange seats within the cargo bike carriers. The seats are frequently inadequately fastened such that the seats in the cargo bike carrier can be disconnected, in particular in the case of accidents, for example.

It is an object of the disclosure to provide a cargo bike transport carrier for transporting persons which offers improved safety.

According to the disclosure, the object is achieved with a cargo bike transport carrier.

SUMMARY OF THE INVENTION

According to a preferred embodiment, the cargo bike transport carrier comprises a bottom element, two opposite side walls, a rear wall and a front wall. Preferably, the cargo bike transport carrier is made of a plastic material and in particular assembled of two or more plastic parts. Inside the cargo bike transport carrier at least one seat element is arranged. Here, the seat element can in particular comprise a seat portion and a back portion. In addition, for fastening the seat element in the cargo bike transport carrier, a holding means is provided. According to the disclosure, the holding means is configured such that it comprises at least one holding element which is in particular capable of absorbing a large load. In particular, the at least one holding element comprises metal and is in particular made of metal. Such a configuration of the holding means alone can offer a good load-absorbing capability and load transmission. Thereby, the risk of the seat element being disconnected in the case of an accident is reduced.

For further enhancement of safety, it is particularly preferred that the at least one holding element comprises a connecting bracket. This connecting bracket is preferably a bracket extending circumferentially around the cargo bike transport carrier thus defining a type of clamp. In particular, such a connecting bracket is made of metal or comprises metal such that this is a very robust element. The clamp- or frame-type configuration of such a connecting bracket can allow for a high rigidity and stability. According to the disclosure, it is thus particularly preferred that the at least one seat element is indirectly or directly fastened to this connecting bracket. Forces produced during an accident, which are transmitted to the seat element via a safety belt, for example, are thus essentially transmitted into the connecting bracket and not into the cargo bike transport carrier itself. This offers the advantage that the force is not transmitted into a component preferably made of plastic material, namely the cargo bike transport carrier, but into a considerably more robust component, namely the connecting bracket in particular made of metal. According to a particularly preferred embodiment of the disclosure, the connecting bracket is at least partially surrounded by the cargo bike transport carrier which is in particular made of plastic material. It is preferred that only the places where the seat elements or safety belts can be fastened are not surrounded by plastic material.

According to a preferred embodiment, the connecting bracket, which is in particular arranged in an upper region of the cargo bike transport carrier, is connected to the at least a seat element, in particular a back element of the seat element, at shoulder level. Here, the connection can be realized via lugs or tubular connecting elements into which the connecting bracket is inserted.

Further, it is preferred that in addition to or instead of the connecting bracket at least one connecting bar is provided. It is preferred that such a connecting bar is arranged in a lower region, e.g. in particular at the level of a seat portion of the seat element. Preferably, the bars extend between the two side walls of the bike transport carrier and are fixedly connected to the two side walls. Again, the seat element is preferably indirectly or directly connected to the connecting bars. Here, it is again preferred that lugs or tubular elements are provided through which the bars are passed. In particular when at least one seat element is respectively arranged in a front and a rear region of the cargo bike transport carrier, it is preferred that both in the front region, e.g. near the front wall, and in the rear region, e.g. near the rear wall, a connecting bar is arranged.

According to a particularly preferred embodiment, the holding means thus comprises a particularly circumferential connecting bracket and one or two connecting bars. It is thus preferred that each seat element is connected to a connecting bar and the connecting bracket. According to a preferred embodiment, the load is thus absorbed in the shoulder region on the one hand, and in the region near the seat portion of the seat element on the other hand.

According to a preferred aspect of the disclosure, the seat element comprises a seat portion and a back portion, respectively. Here, it is preferred that the seat portion is foldable. This offers the advantage that, when the seat portion is folded up, the cargo bike transport carrier can also be used for transporting other cargo without the seat elements having to be removed. Here, it is preferred that the seat portion is folded via the connecting elements by means of which the seat element and the seat portion, respectively, are connected to the connecting bar. The connecting elements preferably configured as lugs or tubular parts thus offer the function of a fixed connection between the seat element and the connecting bars and further offer a folding function.

Preferably, together with the seat element, fastening elements for connecting the holding elements in particular integrated in the cargo bike transport carrier are provided. Preferably, the fastening elements are connected to the back portion of the seat element. It is particularly preferred that at least one upper fastening element and at least one lower fastening element are provided. The upper fastening element in particular serves for a fixed connection to the holding element, in particular the connecting brackets. Here, fixing can be realized via a fixed connection by screws or the like.

The lower fastening element is preferably configured such that, in the mounted condition, it has a downward facing opening and/or a U-shaped cross-section. A fastening element configured in such a manner allows for being fitted to a holding element, in particular the connecting bar, from above. The lower fastening element can absorb horizontal forces or transmit them to the connecting bar or another corresponding holding element. In connection with the upper fastening elements which realize a fixed connection to the holding elements, in particular the connecting brackets, the seat element is adapted to be fixed in the cargo bike transport carrier in a simple manner. For this purpose, it is merely required that the seat element is fitted to the connecting bar via the lower fastening element, and that the two upper fastening elements, which in particular include screws, are fixed.

In addition, it is preferred that the seat element comprises a head portion. This head portion which in particular includes a headrest is preferably adjustable and in particular height-adjustable. In addition, it is preferred that the head portion is foldable. Here, again, folding can be realized via sleeve-like or tubular elements which are pivotably connected to the connecting bracket. Preferably, the size of the foldable elements, e.g. the headrest and the seat portion, is designed such that in the folded-down condition the head portion is arranged in front of the seat portion and the head portion and the seat portion partially overlap each other, respectively. In particular when the head portion overlaps the seat portion, the advantageous configuration is realized where the head portion can be folded up in a simple manner and the seat portion is automatically folded down and/or drops down into the seating position.

Further, according to a preferred aspect of the disclosure, in particular a safety belt is provided for each seat element. Here, it is preferred that the safety belt is not or not only connected to the seat element but is connected to at least to one of the holding elements. To ensure good load transmission, it is particularly preferred that the safety belt is connected to both the connecting bracket and a connecting bar.

According to a particularly preferred aspect of the disclosure, the cargo bike transport carrier is made up of a plurality of parts, in particular two plastic parts. The plastic parts are preferably made from a particle foam or by plastics injection molding. According to a particularly preferred embodiment, the plastic parts include particle foam and are in particular made from particle foam. In particular, they are thermoplastic particle foams. EPP (expandable polypropylene) is suitable, for example. Alternatively, at least individual parts of the cargo bike transport carrier can be made as injection molded plastic parts.

According to a particularly preferred aspect, these plastic parts are connected to each other by connecting elements, in particular a connecting bracket and one or two connecting bars. The connecting elements thus have not only the function of fixing the seat elements and absorbing the loads but have the additional function of connecting the parts of the cargo bike transport carrier with each other.

According to a particularly preferred embodiment, the cargo bike transport carrier thus comprises a bottom element, two opposite side walls, a rear wall and a front wall. According to the disclosure, the cargo bike transport carrier is made from at least two plastic parts. Here, a first plastic part comprises at least one of the side walls and the second plastic part comprises at least the second side wall. The remaining components, e.g. the bottom element, the rear wall and the front wall, can be separate components. It is particularly preferred that at least one of the plastic parts, in particular two plastic parts, comprise, in addition to one of the side walls, at least a portion of the bottom element and/or a portion of the rear wall and/or a portion of the front wall. In particular, these two plastic parts are configured such that a vertical parting is realized. A vertical parting in the mounted condition means that the parting plane between the plastic parts essentially extends vertically, wherein a plurality of parting planes can be provided when the cargo bike transport carrier is made up of a plurality of plastic parts and/or the parting plane can be made up of a plurality of vertical parting plane regions offset with respect to each other.

It is particularly preferred that the cargo bike transport carrier is essentially made up of only two plastic parts, e.g. in particular two halves. At least one of the two halves comprises, in addition to the side wall, at least portions of the bottom element, the rear wall and the front wall, wherein the second plastic part comprises a side wall or a side wall and at least a portion of the bottom element and/or the rear wall and/or the front wall. Here, it is particularly preferred that the two plastic parts, in addition to a side wall, each comprise a portion of the bottom element and a portion of the rear wall and a portion of the front wall. In particular, it is preferred that the two plastic parts configured as halves each also comprise half of the bottom element, the rear wall and the front wall. The parting plane between the two plastic parts configured as halves in the mounted condition thus extends as a vertical center surface.

In particular, it is preferred that the two plastic parts are not only configured as halves but are mirror-inverted or mirror-symmetrical to this vertical parting plane, wherein, here, the vertical parting plane is the plane between the two halves and not a mold parting plane of a two-part plastic mold. Such mold parting planes are additionally provided since the individual plastic parts must be removed from the mold.

The preferred embodiment of the individual parts described above, in particular the halves of the plastic bike box made up of plastic parts, in particular offers the advantage that the individual parts can be easily removed from the mold. The required mold is considerably smaller than a mold in which the overall cargo bike transport carrier would be made from one plastic part.

Further, according to the embodiment of the disclosure, the cargo bike transport carrier made from a plurality of parts, in particular two halves with a vertical parting plane, offers the advantage that in the individual parts recesses, deepened portions and the like can be provided in a simple manner without the mold for manufacturing the plastic part having to comprise complex sliders, lost cores and the like for producing undercuts.

It is particularly preferred that a direction for removing the plastic parts, in particular the two halves, from the mold extends vertically to the respective side wall and/or in parallel to the front wall and/or the rear wall and/or the bottom element. Thus it is possible to easily remove the plastic part from the mold and in particular not to produce any undercuts.

Preferably, on the inside of the side walls and/or on the outside of the side walls reinforcing ribs are provided. In the case of the preferred direction of removal from the mold and due to the configuration of the cargo bike transport carrier of in particular two vertically parted halves such reinforcing ribs or the like can be provided without any undercuts being produced. By providing such reinforcing ribs the rigidity can be improved and/or material can be saved and the weight can be reduced, respectively. Here, the reinforcing ribs can be configured such that they can serve as arm rests, holding elements for attachments, such as drinking bottles, storage compartments and the like, for example.

In addition to the reinforcing ribs, recesses open in the direction of removal from the mold can be easily formed on the inside and/or the outside of the side walls, but also in the front wall or the rear wall. In the bottom element, too, such recesses open in the direction of removal from the mold can be provided. They can also be provided in an open configuration on the inside of the bottom element such that the bottom element comprises grooves or ribs. They serve for reinforcement on the one hand, and can cause the bottom element not to be smooth on the inside on the other hand, such that transport goods do not shift.

According to a particularly preferred embodiment, the plastic parts, in particular the two halves of the cargo bike transport carrier, are connected via connecting elements. The connecting elements are preferably at least partially made of metal. Preferably, a connecting bracket arranged in particular in an upper region of the cargo bike transport carrier is provided. Here, it is preferred that this connecting bracket, like a brace, completely encloses or encompasses the cargo bike transport carrier. The connecting bracket can also be arranged inside the cargo bike transport carrier or in recesses or deepened portions of the cargo bike transport carrier. It is preferred that the connecting bracket is in particular closed and thus constitutes a rigid frame structure which holds together and connects the parts of the cargo bike transport carrier on the one hand, and allows for load absorption on the other hand. It is thus particularly preferred that the connection of the cargo bike transport carrier to the cargo bike is realized via the connecting elements and not via the plastic parts. Thereby, a reliable connection can be ensured.

Preferably, the connecting bracket comprises two bracket elements which are connected to each other via screws, locking elements and the like, for example. The connecting brackets preferable have a U-shape and extend along a side wall, wherein the central portion of the bracket extends along a side wall and the two bosses extend in the region of the front wall and the rear wall. The two bracket elements are connected in the region of the front wall and/or the rear wall, in particular in the center of these two walls. It is particularly preferred that the connection is realized in the region of the parting plane.

Preferably, the brackets are arranged in an upper region near an upper edge of the side walls, the rear wall and the front wall. In particular, the distance of the bracket elements to the upper edge is smaller than 10 cm, in particular smaller than 5 cm. In addition, it is preferred that the connecting bracket is arranged in recesses or openings such that it does not protrude towards the outside of the cargo bike transport carrier.

In addition, it is preferred that at least one, in particular two connecting bars for connecting the individual plastic parts are provided. It is particularly preferred that two connecting bars are provided, wherein one connecting bar is arranged through an inside of the rear wall and the other connecting bar is arranged in the region of an inside of the front wall. Here, the two connecting bars can be configured such that they are arranged between the two opposite side walls and are fixed in and/or at the side walls. It is preferred that the in particular two connecting bars comprise bosses at their ends. Here, one boss can in particular be configured as a head fixedly connected to the bar, and the other boss can be configured as a releasable boss, e.g. a nut. In particular in this embodiment, bracing of the bar and thus the plastic parts is easily realizable. Here, the bosses are preferably arranged in the deepened portions of the side wall which are open towards the outside. These deepened portions can be closed by a cover.

In particular with the combination of a circumferential connecting bracket in the upper region of the cargo bike transport carrier and the two connecting bars in the lower region a good and stable connection of the cargo bike transport carrier can be realized. In particular, the load can be applied via the connecting elements, wherein it is particularly preferred that the cargo bike transport carrier is connected to the cargo bike via the connecting elements.

According to a particularly preferred embodiment, the cargo bike transport carrier has a high shoulder line. Thus the side walls of the cargo bike transport carrier are configured such that the upper edge of the side walls of the cargo bike transport carrier is arranged approximately at the shoulder level of a child sitting in the cargo bike transport carrier. Thus the distance between the upper side of a seating surface of a seat element arranged in the cargo bike transport carrier and the upper edge of the side wall of the cargo bike transport carrier is at least 30 cm, in particular at least 35 cm and particularly preferably at least 40 cm. The upper edge of the cargo bike transport carrier can be configured such that it is inclined in the direction of travel. When both in the rear region of the cargo bike transport carrier, e.g. looking in the direction of travel, and in the front region, e.g. looking in the direction opposite to the direction of travel, seat element are arranged, in the region of the shoulder the upper edge of the cargo bike transport carrier can be 5 cm to 10 cm higher at the rear than that at the front. The shoulder line in both regions is preferably at least 30 cm, in particular at least 35 cm.

In recesses or openings provided in individual parts of the cargo bike transport carrier attachments can be arranged or connected to the cargo bike transport carrier in a simple manner. For example, a step element can be inserted into an in particular slot-shaped opening open to the outside. Thereby, climbing into the cargo bike transport carrier can be facilitated, in particular for children.

According to a preferred embodiment of the cargo bike transport carrier, the latter comprises a cover with the aid of which the upper side of the cargo bike transport carrier can preferably be completely closed. Here, it is preferred that the cover is pivotably, possibly via an intermediate element, connected to the connecting elements, in particular the connecting bracket arranged in the upper region. Thereby, forces produced when opening and closing the cover are essentially not transmitted to the plastic parts but to the connecting elements.

According to another preferred embodiment, the bottom element comprises an opening. This opening allows for access to a battery or the like in its mounted condition and arranged below the cargo bike transport carrier. This opening is preferably in particular hermetically closed by a cover.

Further, the disclosure relates to a cargo bike frame having a chain stay for accommodating a rear wheel, a fork element for accommodating a front wheel and a supporting element for accommodating the cargo bike transport carrier between the handlebar tube and the fork element. Here, the cargo bike transport carrier is configured in a particularly preferred embodiment as described above.

BRIEF DESCRIPTION OF THE DRAWINGS

Hereunder the disclosure will be explained in detail on the basis of a preferred embodiment with reference to the accompanying drawings in which.

DESCRIPTION OF THE INVENTION

Figure 1A:
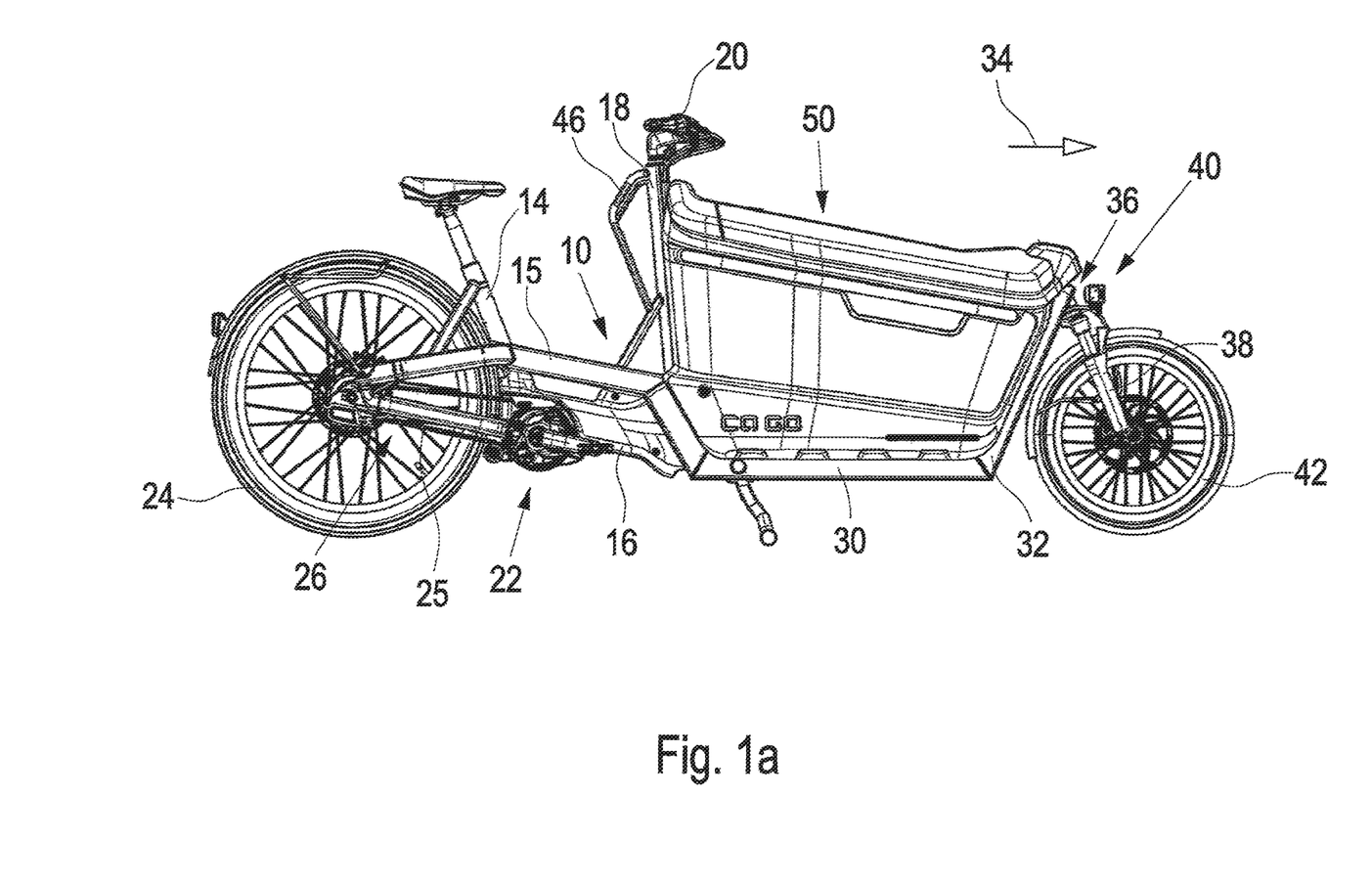
FIG. 1a shows a schematic side view of a cargo bike with a cargo bike transport device configured according to the disclosure.

A preferred embodiment of the cargo bike according to the disclosure as illustrated in FIG. 1a comprises a cargo bike frame 10. In the illustrated exemplary embodiment, the cargo bike frame 10 comprises a saddle tube 14, a top tube 15 and a down tube 16 covered by a covering, as well as a handlebar tube 18. In the handlebar tube 18 a pivotable tube is arranged which is connected to the handlebar 20. Further, in the illustrated exemplary embodiment, a drive means 22 is arranged between the down tube 16 and the saddle tube 14. The drive means comprises a conventional bottom bracket which is connected to an electric motor so that pedaling can be supported by the electric motor. A rear wheel 24 is driven via a drive with the aid of a toothed belt 25 or the like. Further, the cargo bike frame 10 comprises a chain stay 26 supporting the rear wheel 24. In the illustrated exemplary embodiment, a single-track cargo bike is illustrated.

Further, the bike frame 10 comprises a supporting element 28. In the illustrated exemplary embodiment, the supporting element 28 comprises two horizontal frame elements 30 (FIG. 1b) which are connected to the down tube 16 as well as the handlebar tube 18. In the illustrated exemplary embodiment, the two horizontally extending frame elements 30 have connected thereto two fork elements 32 which extend upwards in the direction of travel 34. In the region of a fork steerer 36 they are connected to each other and to the former. The fork steerer 36 forms part of a fork element 40 also including the fork 38 and, in the illustrated exemplary embodiment, supporting a front wheel 42.

Figure 1B:
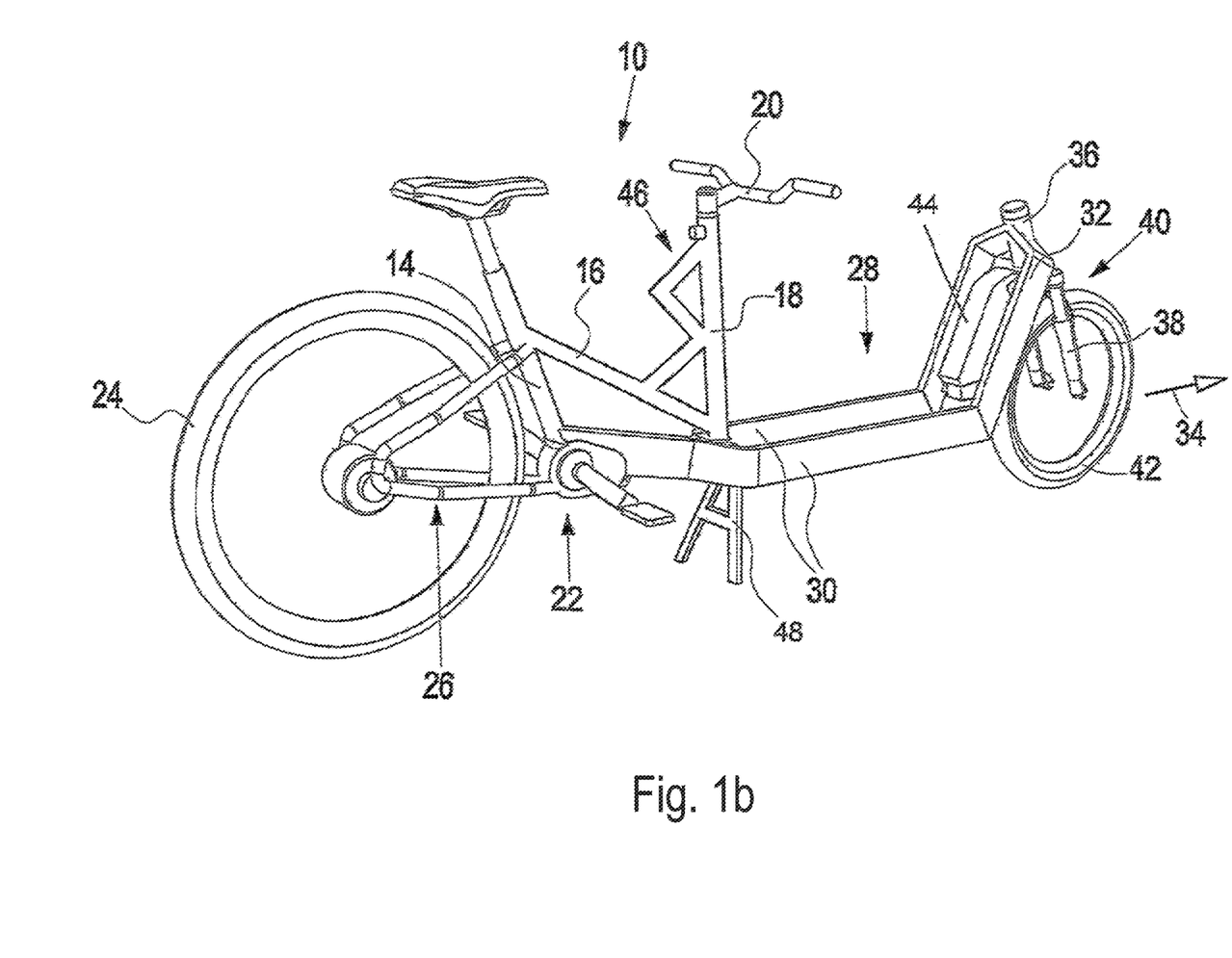
FIG. 1b shows a schematic perspective side view of a cargo bike without a cargo bike transport carrier.

A battery 44 can be connected to the supporting element 28. In the illustrated exemplary embodiment, the battery 44 is arranged between the two fork elements 32 of the supporting element. Further, the battery 44 or another battery can be arranged between the two frame elements 30.

The handlebar tube 18 has connected thereto a grip element 46. In the illustrated exemplary embodiment, the grip element is arranged on a rear side of the handlebar tube 18 and is directed in the direction of the chain stay 26 and/or the direction of the saddle tube 14. Thus, the grip element 46 is arranged in the frame center plane in which, in the illustrated cargo bike, the two wheels as well as the saddle tube 14, the down tube 16 and the handlebar tube 18 are also arranged.

For lifting the cargo bike or to place it onto a main kickstand 48, for example, the user can in particular grip the upper portion of the grip element.

Figure 3:
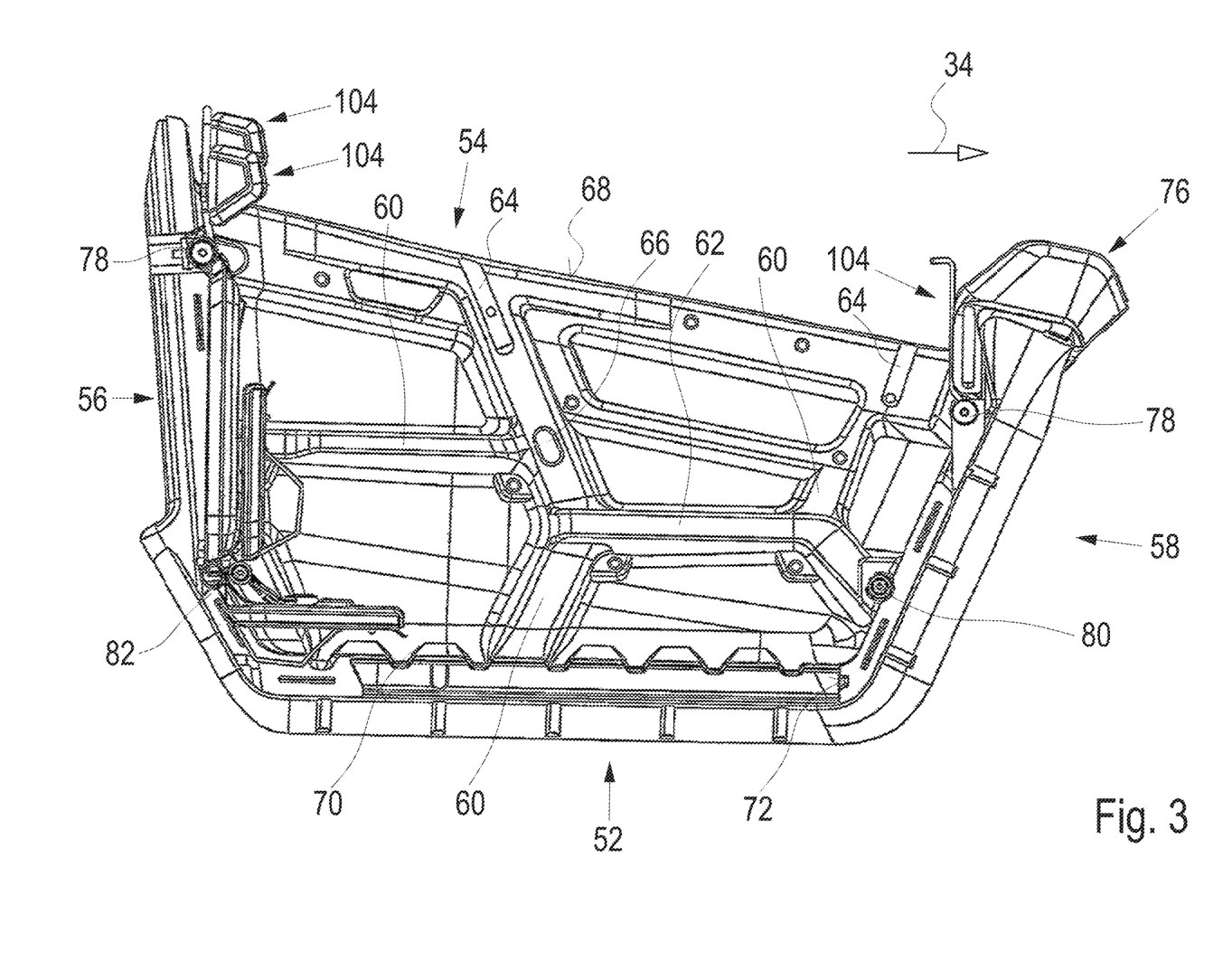
FIG. 3 shows a side view of one of the two halves of the cargo bike transport carrier illustrated in FIG. 1.

A cargo bike transport carrier 50 comprises a bottom element 52, two side elements 54, a rear wall 56 as well as a front wall 58. In the illustrated particularly preferred exemplary embodiment, the cargo bike transport carrier is essentially made up of two plastic parts, as illustrated in FIG. 3. The two plastic parts are of a mirror-inverted configuration relative to a vertical center plane which, in their assembled condition, corresponds to the bike center plane. Each of the two plastic halves thus comprises a side wall 54, half a rear wall 56, half a front wall 58 and half a bottom element 52.

According to the disclosure, the direction of removal from the mold is perpendicular to the side wall 54, e.g. perpendicular to the drawing plane of FIG. 3. This offers the essential advantage that it is possible to provide in a simple manner reinforcing ribs 60 extending in the direction of removal from the mold, wherein individual reinforcing ribs 60, 62 can also be configured as rests, for example arm rests. The ribs 60 and 62 extend in the direction of removal from the mold such that no undercuts are produced. Further, recesses 64, 66 can be provided in the ribs, said recesses being open towards the inside or in the molding direction. The slot-shaped recesses 64 are further open on an upper side 68 of the side wall 54 such that rods of a hood can be inserted and adjusted here. In the recess 66 a bottle holder, a holder for transport goods etc. can be attached.

In the illustrated exemplary embodiment, recesses 70 configured as grooves are provided in the bottom element 52, which recesses are arranged on an inside of the bottom element 52 and also extend in the direction of removal from the mold. Thereby, the surface of the bottom element can be patterned thus improving the rigidity. Further, an opening 72, half of which is shown in FIG. 3, is provided in the bottom element. The opening allows for access to a battery, which in the mounted condition is arranged between the two frame elements 30 of the bike frame 10, for maintenance or removal purposes, for example. The opening 72 is closed by a cover 74.

Further, in the front end region of the front wall 58 a boss 76 is provided. The latter covers an upper side of the fork steerer. The boss 76 extends beyond the upper region of the fork element in the direction of travel and serves as an impact protection, inter alia.

Figure 2:
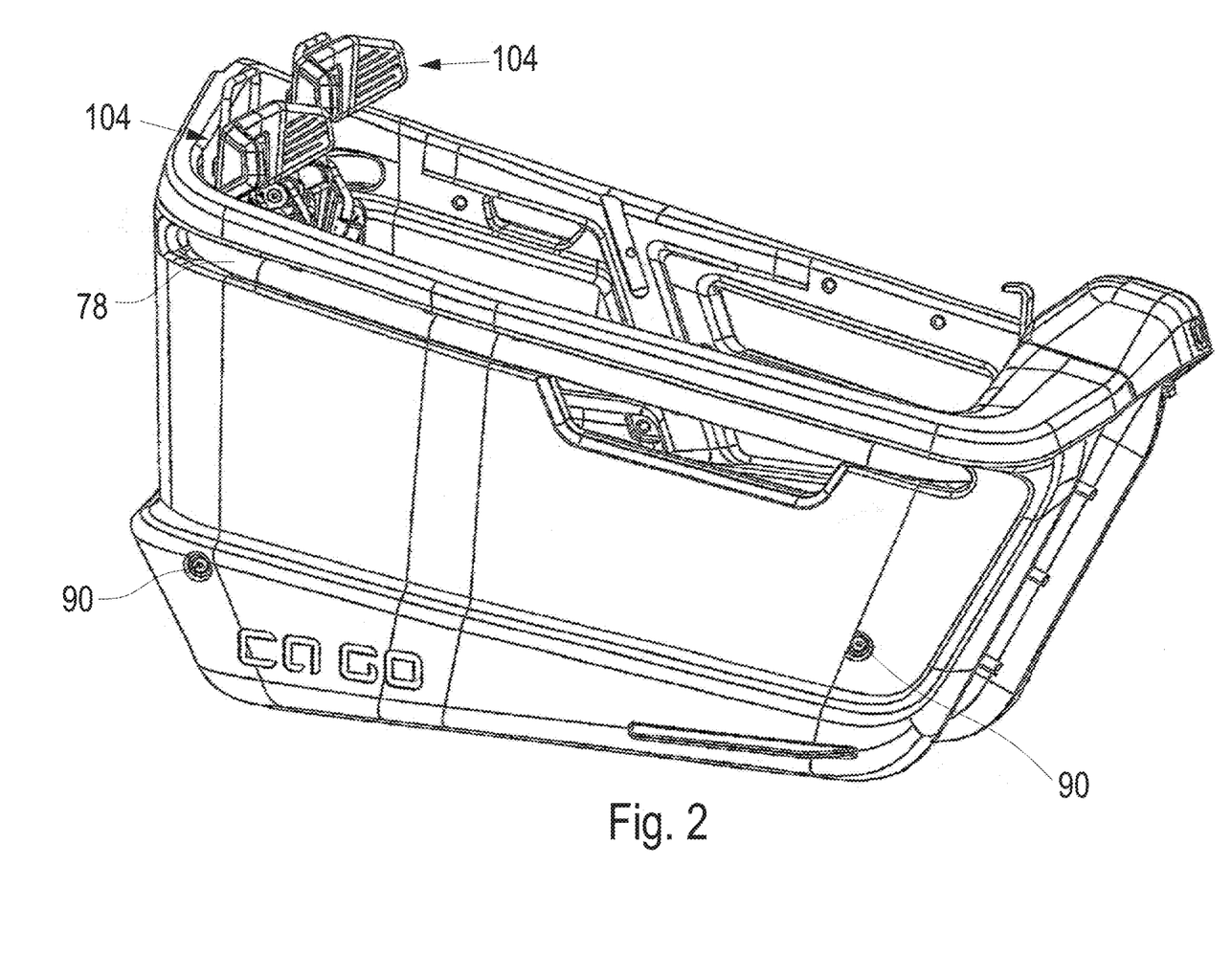
FIG. 2 shows a perspective side view of a first preferred embodiment of the cargo bike transport carrier.

The two plastic halves illustrated in FIG. 3 are assembled to form the cargo bike transport carrier illustrated in FIG. 2. For fixing and/or connecting the two halves, a connecting bracket made up of two bracket elements 78 is provided in an upper region. The two bracket elements are connected to corresponding connecting elements in the region of the parting plane. The parting plane is the front side of half the rear wall 56 and/or half the front wall 58 as well as half the bottom element 52 illustrated in FIG. 3. The two bracket elements 78 are fixedly connected and/or braced to each other such that they form a clamp in the upper region of the cargo bike transport carrier.

Further, for connecting the two plastic halves two connecting bars 80, 82 (FIG. 4) are provided. A connecting bar, which is a rear connecting bar as seen in the direction of travel 34, is arranged in a recess 84 (FIG. 3). The recess 84 is provided in an inwardly extending rib-shaped boss 86. On the opposite side, i.e. in the other half of the injection molded part, the arrangement is the same. The front connecting bar 80 is arranged in a recess 88 (FIG. 3). For bracing the two halves of the cargo bike transport carrier, the connecting bars 80, 82 comprise a boss configured as a head on one side, for example, wherein on the other side of the bars a nut is screwed on. Likewise, the two connecting bars can have an internal thread such that fixing can be effected from the outside in particular by fixing elements 90 in particular configured as screws (FIG. 2).

Inside the cargo bike transport carrier 50 not only cargo can be provided but also, according to the disclosure, seats 104 for children. Instead of a seat element 104 arranged in the front as seen in the direction of travel 34, a storage compartment can be inserted into the transport carrier 50. The storage container can be easily adjusted and/or suspended to the inside of the transport carrier between accommodation units.

According to the disclosure, in particular a plurality of seat elements 104, three in the illustrated embodiment, for example, are arranged in the cargo bike transport carrier. The seat elements 104 comprise a back portion 108 and a seat portion 110, as can in particular be seen in FIGS. 4 and 5. Further, a head portion 112 is provided. The seat portion 110 comprises connecting and/or fastening elements 114. They have loop-shaped or tubular ends through which the connecting bars 80, 82 pass. Thereby, a stable connection between the seat portions 110 and the connecting bars 80, 82 is realized, which connection is in particular suitable for good load transmission. The seat element 110 can be folded about the connecting bar 80, 82 in the direction indicated by an arrow 116. When the seat is folded up (FIG. 4), the interior of the cargo bike transport carrier can be used for accommodating other cargo.

Figure 4:
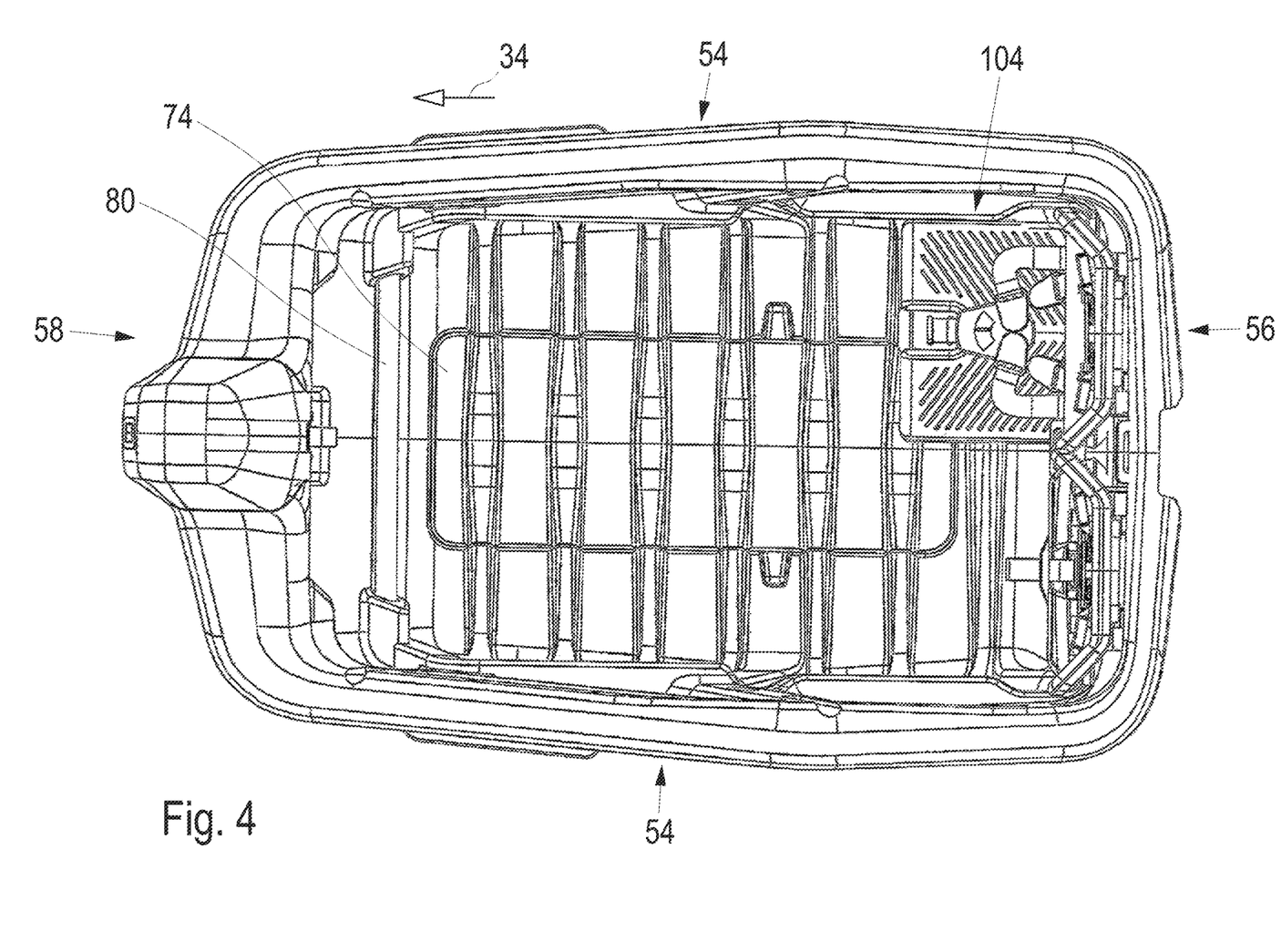
FIG. 4 shows a top view of a cargo bike transport carrier with integrated seats.
Figure 5:
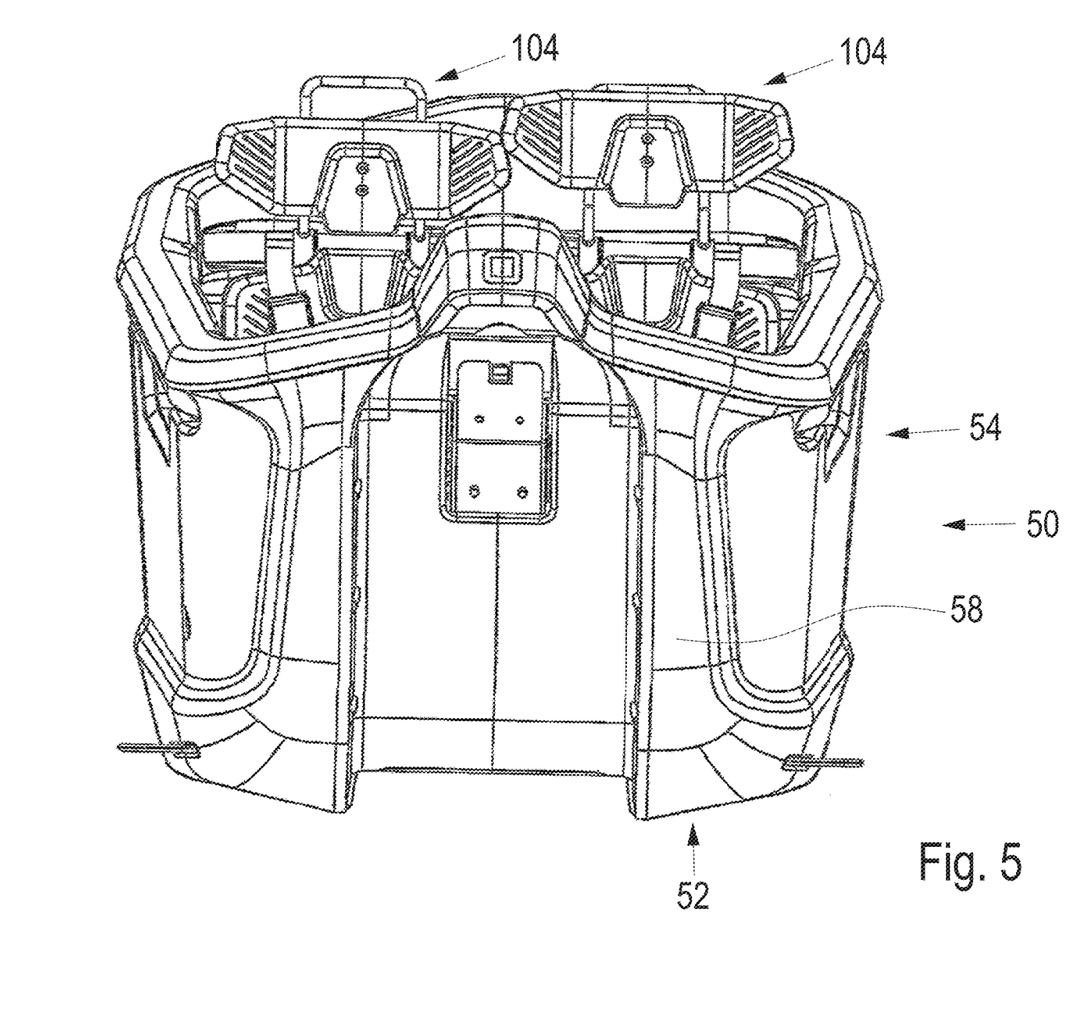
FIG. 5 shows a perspective view of a cargo bike carrier as seen from the front, i.e. opposite to the direction of travel.

The back portion 108 is fastened to the connecting bracket 78 via fastening elements 118 corresponding to the fastening elements 114. The connecting bracket 78 extends through the tubular bosses. In addition, the back portion 108 can also be fastened to the connecting bars 80, 82 via corresponding connecting elements.

The head portion 112 comprises a bracket 120 supporting the head portion 112. The head portion 112 is adapted to be displaced along the bracket 120 in the direction indicated by an arrow 122 for height adjustment. At its ends directed downwards in FIG. 6, the bracket comprises tubular or annular bosses. The connecting bracket 78 passes through them. The head portion 112 is adapted to be pivoted downwards about the connecting bracket, as indicated by an arrow 124.

Figure 6:
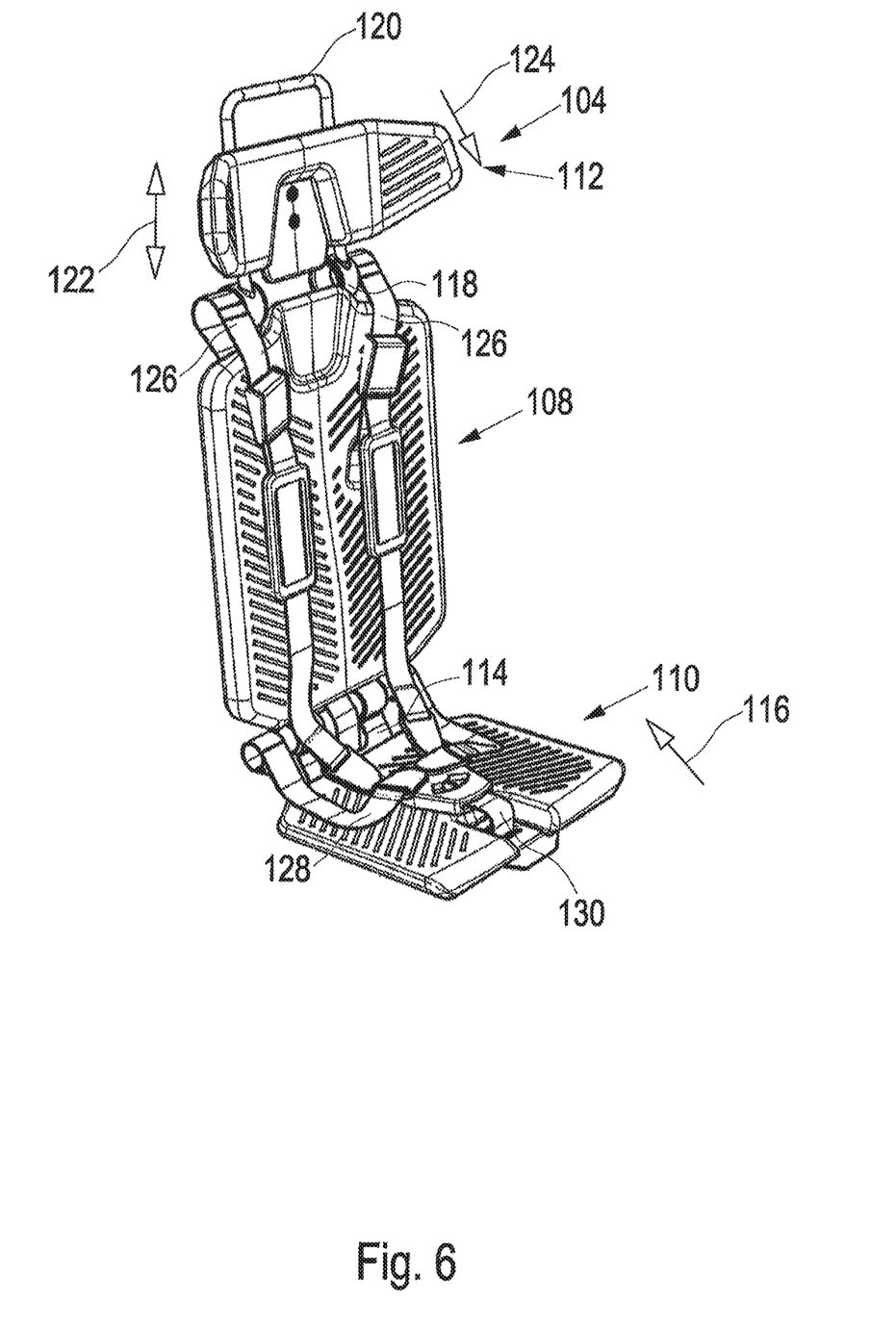
FIG. 6 shows a schematic perspective view of a first preferred embodiment of a seat element.

In addition, in the illustrated exemplary embodiment of the seat elements 104, a safety belt is provided. This is a safety belt comprising two safety straps 126. The safety straps 126 are fixedly connected to the connecting bracket 78 on the one hand, and to the connecting bars 80, 82 on the other hand. Via a belt buckle 128 the two safety straps 126 are connected to each other, and via another belt 130 they are connected to the seat portion 110. Such an arrangement of the safety belt realizes a load transmission to the connecting bracket 78 and the connecting bars 80, 82.

Figure 7:
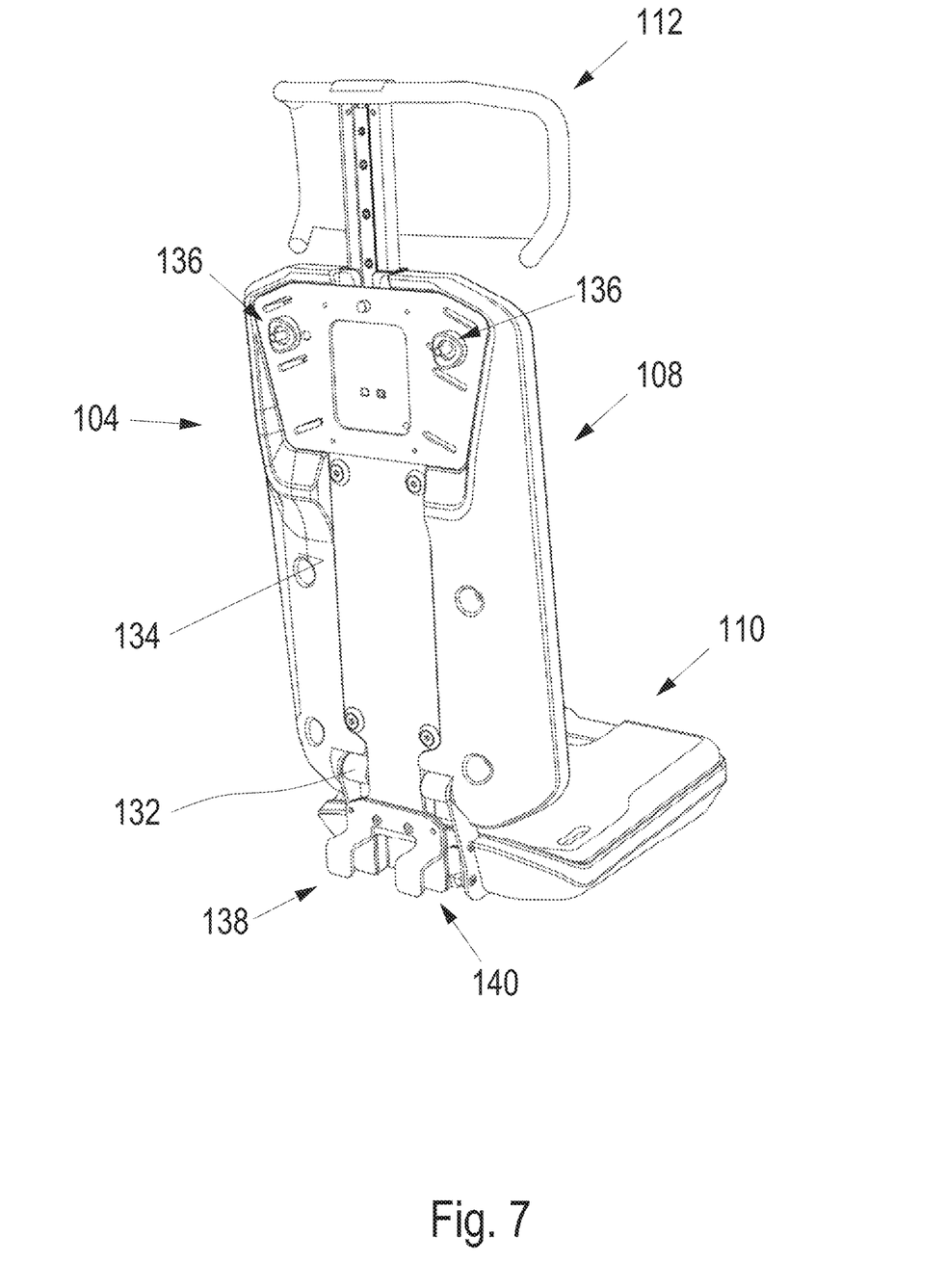
FIG. 7 shows a schematic perspective view of a second preferred embodiment of a seat element.

In another embodiment of a seat element schematically illustrated in FIG. 7, similar or identical components are designated by the same reference numerals.

Here, too, the seat element 110 is of a foldable configuration, wherein a corresponding folding or pivoting of the seat element 110 is effected about a pivoting axis 132 in the back portion 108.

The essential difference of the seat element illustrated in FIG. 7 is the manner of fastening the seat element in the cargo bike transport carrier. For fastening purposes, two upper fastening elements 136 and a lower fastening element 138 are provided on a rear side 134 of the back portion 108. The two upper fastening elements 136 comprise screws. They are inserted in horizontal bores provided at the connecting brackets 78. Thereby, a fixed connection between the seat element 104 and the connecting brackets 78 is realized.

The lower connecting element is configured as a hook and comprises a downwardly directed opening 140. With the aid of the opening 140 it is possible to fit the lower fastening element 138 to a connecting bar 80, 82 from above. Thus, loads acting in the horizontal direction are transmitted via the lower fastening element 138.

The invention claimed is:

1. A cargo bike transport device comprising:
   a cargo bike transport carrier;
   at least one seat element arranged inside the cargo bike transport carrier, and
   a holding means for the seat element, wherein the holding means comprises at least one holding element such that the holding means is designed to absorb large loads,
   wherein the at least one holding element comprises both at least one connecting bracket connected to the at least one seat element at shoulder level and at least one connecting bar connected to the at least one seat element in a lower region,
   wherein the at least one seat element comprises a head portion,
   wherein the head portion is foldable, and
   wherein the head portion is fastened to the at least one connecting bracket in a manner that the head portion can be folded.

2. The cargo bike transport device according to claim 1, wherein the at least one holding element is made of metal.

3. The cargo bike transport device according to claim 2, wherein the at least one connecting bracket is configured as a circumferential connecting bracket.

4. The cargo bike transport device according to claim 3, wherein the at least one connecting bracket comprises two bracket elements which are connected to each other in a region of a rear wall and a front wall of the cargo bike transport carrier.

5. The cargo bike transport device according to claim 3, wherein the at least one connecting bracket is formed from two bracket elements, wherein the cargo bike transport carrier is formed from a plurality of plastic parts, and wherein the two-pieced connecting bracket connects the plurality so as to form the cargo bike transport carrier.

6. The cargo bike transport device according to claim 1, wherein the at least one connecting bar is arranged on an inside of a rear wall and/or an inside of a front wall of the cargo bike transport carrier.

7. The cargo bike transport device according to claim 1, wherein the at least one seat element comprises a seat portion and a back portion.

8. The cargo bike transport device according to claim 7, wherein the seat portion is foldable, and wherein the seat portion is fastened to the at least one connecting bar in a manner that the seat portion can be folded.

9. The cargo bike transport device according to claim 7, wherein at least one fastening element is provided on the back portion of the at least one seat element such that the at least one fastening element can be connected to one or more of the at least one connecting bracket and/or the at least one seat element.

10. The cargo bike transport device according to claim 7, wherein the back portion of the at least one seat element is fastened to the at least one connecting bracket and/or the at least one connecting bar by at least one fastening element.

11. The cargo bike transport device according claim 9, wherein the at least one fastening element comprise at least one upper fastening element that is fixedly connected to the at least connecting bracket via at least one screw.

12. The cargo bike transport device according to claim 11, wherein the at least one fastening element further comprise at least one lower fastening element in the form of a hook-shaped and/or U-shaped configuration.

13. The cargo bike transport device according to claim 12, wherein the at least one lower fastening element is designed to be fitted onto the at least one connecting bar from above.

14. The cargo bike transport device according to claim 1, wherein the head portion is height-adjustable.

15. The cargo bike transport device according to claim 1, wherein the cargo bike transport carrier comprises two seat elements located side by side on an inside of a rear wall and/or one seat element located on an inside of front wall.

16. The cargo bike transport device according to claim 1, wherein the cargo bike transport carrier has a high shoulder line.

17. The cargo bike transport device according to claim 1, wherein an upper side of a seating surface of the at least one seat element in the cargo bike transport carrier and an upper edge of a side wall of the cargo bike transport carrier are spaced apart by a distance of at least 30 cm.

18. A cargo bike transport device comprising:
a cargo bike transport carrier;
at least one seat element arranged inside the cargo bike transport carrier, and
a holding means for the seat element, wherein the holding means comprises at least one holding element such that the holding means is designed to absorb large loads,
wherein the at least one holding element comprises both at least one connecting bracket connected to the at least one seat element at shoulder level and at least one connecting bar connected to the at least one seat element in a lower region,
wherein the at least one holding element is made of metal,
wherein the at least one connecting bracket is configured as a circumferential connecting bracket,
wherein the at least one connecting bracket is formed from two bracket elements,
wherein the cargo bike transport carrier is formed from a plurality of plastic parts, and
wherein the two-pieced connecting bracket connects the plurality so as to form the cargo bike transport carrier.

19. A cargo bike transport device comprising:
a cargo bike transport carrier;
at least one seat element arranged inside the cargo bike transport carrier, and
a holding means for the seat element, wherein the holding means comprises at least one holding element such that the holding means is designed to absorb large loads,
wherein the at least one holding element comprises both at least one connecting bracket connected to the at least one seat element at shoulder level and at least one connecting bar connected to the at least one seat element in a lower region,
wherein the at least one seat element comprises a seat portion and a back portion,
wherein at least one fastening element is provided on the back portion of the at least one seat element such that the at least one fastening element can be connected to one or more of the at least one connecting bracket and/or the at least one seat element, and
wherein the at least one fastening element comprise at least one upper fastening element that is fixedly connected to the at least connecting bracket via at least one screw.

20. The cargo bike transport device according to claim 19, wherein the at least one fastening element further comprise at least one lower fastening element in the form of a hook-shaped and/or U-shaped configuration.

21. The cargo bike transport device according to claim 20, wherein the at least one lower fastening element is designed to be fitted onto the at least one connecting bar from above.

* * * * *